United States Patent [19]
Buzogany

[11] 3,776,653
[45] Dec. 4, 1973

[54] CORRUGATED ELASTIC SHIM AND SHAFT AND HUB

[75] Inventor: Alexander S. Buzogany, Morrisville, Pa.

[73] Assignee: Roller Bearing Company of America, West Trenton, N.J.

[22] Filed: Oct. 20, 1971

[21] Appl. No.: 190,968

[52] U.S. Cl. .......................................... 403/372
[51] Int. Cl. ............................................. F16d 1/06
[58] Field of Search.................... 287/52.04, 52.05, 287/52 R, 53 H

[56] References Cited
UNITED STATES PATENTS

| | | | |
|---|---|---|---|
| 3,061,386 | 10/1962 | Dix et al. | 308/184 R |
| 2,197,631 | 4/1940 | Doran | 287/52.05 |
| 2,931,412 | 4/1960 | Wing | 287/52 R |
| 3,142,887 | 8/1964 | Hulck et al. | 29/148.4 C |
| 2,015,918 | 10/1935 | Brabant | 287/53 H |
| 2,220,346 | 11/1940 | Mueller | 287/53 H |

*Primary Examiner*—Andrew V. Kundrat
*Attorney*—Joseph Gray Jackson et al.

[57] ABSTRACT

A corrugated elastic shim mounting for a hub on a shaft, in which the shaft and the hub have cooperating interlocks such as flats which transmit the torque, and in which the shim occupies space between the hub and the shaft which is substantially less than a complete circumference, but preferably more than 180°. The shim according to the invention is relieved of the torque transmitting function and must perform only the mounting, engaging or positioning functions.

5 Claims, 3 Drawing Figures

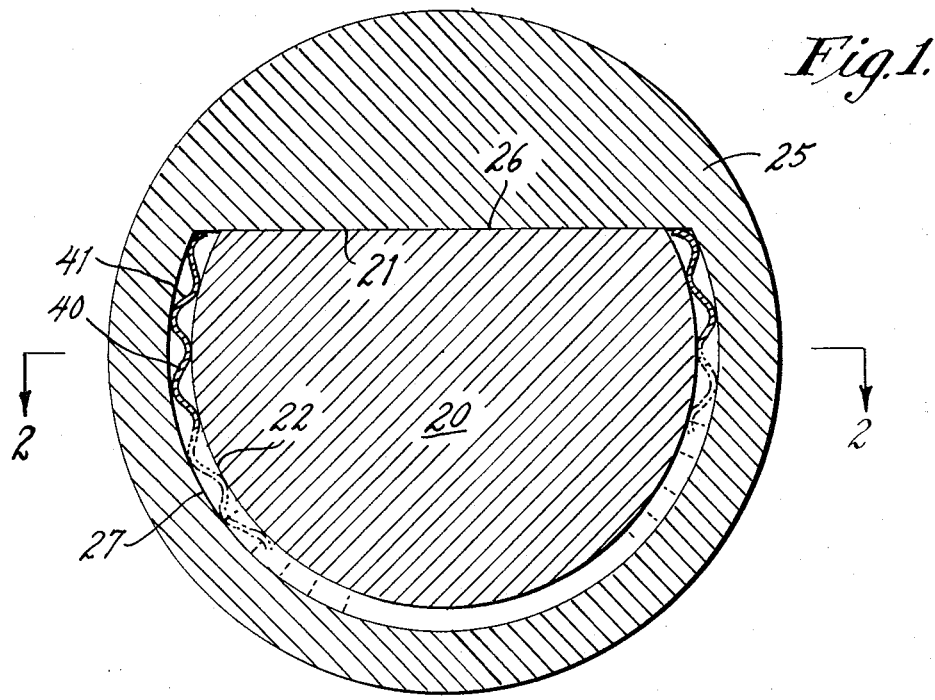
Fig.1.
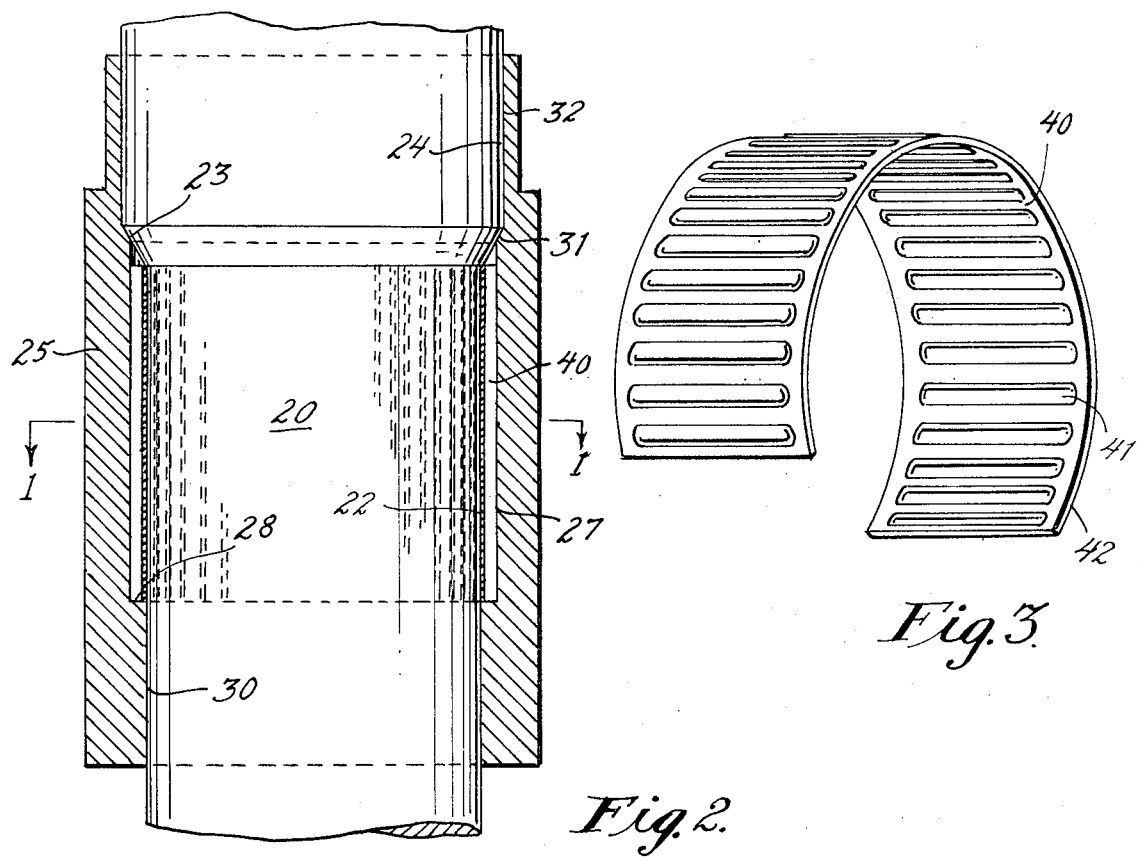
Fig.2.
Fig.3.

CORRUGATED ELASTIC SHIM AND SHAFT AND HUB

DISCLOSURE OF INVENTION

The invention relates to shaft and hub mountings using corrugated elastic shims.

In the prior art corrugated elastic shims manufactured according to Dixon and Wehr U.S. Pat. No. 3,061,386, granted Oct. 30, 1962 for Tolerance Rings, and Hulck and Schultes U.S. Pat. No. 3,142,887, granted Aug. 4, 1964 for Method of Making a Split Annular Tolerance Ring, as described in Roller Bearing Company of America catalogs on Star Tolerance Rings (1961, 1962 and 1965) are extensively used to mount hubs on shafts. These shims are of two types, one intended for insertion first into a hole of the hub into which the shaft is later pressed (Type AN), and the other intended first for insertion around the shaft or within a circumferential recess around the shaft, and then the shaft and the corrugated elastic shim to be pressed into interior openings of a rotating part surrounding the same (Type BN).

The hub may be the hub of a pulley, gear, lever, bearing race, or any other machine part as well known in the art and by describing it as a hub it is intended to indicate that it is a part mounted on a shaft, without limiting it as to its additional functions.

Heretofore the space between the shaft and the hub in which the corrugated elastic shim has been inserted has been a complete circumference of 360° and the force which transmits torque from the shaft to the hub or from the hub to the shaft, as well as the force which assures that the hub and shaft are properly positioned, that they are not free to chatter, and that they do not move from the position they are supposed to assume, is all supplied by the corrugated elastic shim which is in engagement with the shaft and the hub. In use of corrugated elastic shims heretofore so much force has been required to insert them due to their requirement of transmitting torque, that they have been very tedious to insert and in some cases have slowed up production.

In the present invention it is contemplated that the hub and the shaft be differently designed and that the torque transmitting function be assumed by an interlock or engaging flats between the hub and the shaft, while the positioning and tightness functions are still performed by the corrugated elastic shim.

Many hubs are now held on shafts by flats or recesses in the shaft which are engaged by set screws or the like in the hub. These mountings are, however, subject to the difficulty that the set screws may become loose, the said screw threads may become closed, or the engagement between said screws and the shaft may become worn presenting special difficulties which prevent the hub mounting from functioning.

Shafts and hubs have been shaped to fit keys, which however involve an expensive machining problem, may cause stress concentration because of sharp angles, and may work loose and become ineffective.

In the present invention the interlocking portions or flats between the hub and the shaft are very simple and inexpensive to form, and do not necessitate any sharp angles which may cause stress concentration.

The invention, therefore, may use a shaft provided with a flat as heretofore, with a slight modification of the hub, and with a corrugated elastic shim between the shaft and the hub.

In the invention, due to the absence of the requirements to transmit torque by the corrugated elastic shim, the corrugated elastic shim can be less severely compressed, thereby resulting in reduced assembly forces. Also the shims could be made of lighter gauge stock.

In the drawings I have chosen to illustrate one embodiment of my invention, choosing a form which is simple to illustrate, which operates satisfactorily, and will at the same time disclose the generality of the concept.

FIG. 1 is a transverse section of a hub, shaft and corrugated elastic shim according to the invention, the section being taken on the line 1—1 of FIG. 2.

FIG. 2 is a longitudinal section of FIG. 1 on the line 2—2.

FIG. 3 is a perspective of one type of corrugated elastic shim which may be employed in the invention.

A shaft 20, in cross section as shown in FIG. 1, has a flat or engaging portion 21 on one side and a circular portion 22 on the other side adapted to be engaged by the corrugated elastic shim. The arcuate length of the portion 22 is variant, and in some cases may be as little as 90°, though preferably the arcuate length of the circular portion is between 180° and 270° as shown.

When considering the longitudinal section, as seen in FIG. 2, the shaft may have a taper 23 and an enlarged head 24 which is used for establishing the longitudinal adjustment of the hub as later explained. Surrounding the shaft is a hub 25 which in cross section has a flat or interengaging portion 26 which engages and cooperates with the flat 21 on the shaft and transmits torque from the shaft to the hub or from the hub to the shaft. While the surfaces 21 and 26 desirably may be mutually engaging flats, it will be evident that they can if desired have some other contour as long as it is not in continuation of the circular surface 22.

Over the portion of the contour adapted to cooperate with the circular surface 22, the hub has a circular surface 27 which as seen in FIG. 2 is preferably an annular recess so that there is a spacing between the concentric circular surfaces 22 and 27 in which the corrugated elastic shim can be placed. The surface 27 and the recess preferably terminate in a shoulder 28 and other parts of the hub have circular engaging portion 30 which has adequate clearance from the shaft but preferably engages the shaft all around.

At the other end the hub preferably has a tapered surface 31 which engages tapered surface 23 on the shaft for longitudinal positioning and has an enlarged circular surface 32 which engages the circular surface 24 around the shaft. The hub may be made of any suitable material, including powder metal, plastic or otherwise.

As best seen in FIG. 3, there is a corrugated elastic shim 40 between the circular surfaces 22 and 27 of the shaft and the hub, the shim 40 having corrugations 41 which extend from one side to the other and rims 42 which are preferably not corrugated at either edge. The shim 40 occupies the space between the circular surface 22 on the shaft and the circular surface 27 on the hub with the corrugations slightly deflected due to their spring properties. The corrugated elastic shim is preferably substantially as long as the arcuate length of the circular surfaces 22 and 27, fitting in the space between the shaft and the hub.

It will be evident that the space occupied between the shim as shown in cross section in FIG. 1 also has abutments or shoulders at each end of the arcuate space where the shim engages the hub. This is an extra insurance against loosening of the corrugated elastic shim.

It will be evident that the corrugated elastic shim may be of carbon steel such as AISI 1070 or 1074, usually hardened after forming, or stainless steel type 301, usually cold worked before forming. Also, the shim may be made of beryllium copper (subsequently heat treated), phosphor bronze cold worked to spring properties, or Monel metal cold worked to spring properties and suitably containing nickel 67 percent by weight, copper 30 percent, manganese 1 percent, iron 1.5 percent.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In the shaft and hub combination, a shaft having a portion of exterior circular contour less than a complete circumference and a portion of non-circular contour, a hub surrounding the shaft having a portion of circular contour larger in diameter than the shaft and less than a complete circumference and a portion of non-circular contour on the hub engaging the portion of non-circular contour on the shaft, and a corrugated elastic shim extending around the portion of circular contour on the shaft and engaging both the shaft and the hub.

2. An invention of claim 1, in which the portions of non-circular contour are flat portions.

3. An invention of claim 1, in which the corrugated elastic shim has rims and also corrugations.

4. An invention of claim 1, in which the shim and the portions of circular contour extend over more than half the circumference.

5. An invention of claim 4, in which the shaft has a radial shoulder, and the hub has a radial portion engaging the radial shoulder and establishing the longitudinal position of the hub.

* * * * *